(12) United States Patent
Carretero Benignos et al.

(10) Patent No.: US 11,867,122 B2
(45) Date of Patent: Jan. 9, 2024

(54) PROPULSION ASSEMBLY FOR AN AIRCRAFT

(71) Applicants: Airbus SAS, Blagnac (FR); Airbus Operations SAS, Toulouse (FR)

(72) Inventors: Jorge Alejandro Carretero Benignos, Taufkirchen (DE); Lionel Czapla, Toulouse (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 0 days.

(21) Appl. No.: 17/963,237

(22) Filed: Oct. 11, 2022

(65) Prior Publication Data

US 2023/0167770 A1    Jun. 1, 2023

(30) Foreign Application Priority Data

Oct. 13, 2021 (FR) ...................................... 2110851

(51) Int. Cl.
| | |
|---|---|
| *F02C 7/16* | (2006.01) |
| *B64D 27/12* | (2006.01) |
| *B64D 29/06* | (2006.01) |
| *B64D 33/08* | (2006.01) |
| *B64D 37/32* | (2006.01) |

(Continued)

(52) U.S. Cl.
CPC ................ *F02C 7/16* (2013.01); *B64D 27/12* (2013.01); *B64D 29/06* (2013.01); *B64D 33/08* (2013.01); *B64D 37/32* (2013.01); *F02C 7/22* (2013.01); *F02C 9/46* (2013.01);

(Continued)

(58) Field of Classification Search
CPC .... F02C 7/24; F02C 7/045; F02C 3/22; F02C 7/224; F02C 7/16; F02C 7/14; F05D 2260/963; F05D 2220/323; F02K 1/34
See application file for complete search history.

(56) References Cited

U.S. PATENT DOCUMENTS 6,250,061 B1 * 6/2001 Orlando .................... F02C 7/18
60/772
7,013,636 B2 * 3/2006 Iya .......................... F02K 1/822
60/770

(Continued)

FOREIGN PATENT DOCUMENTS

| EP | 3623602 A1 | 3/2020 |
|---|---|---|
| EP | 3487764 B1 | 4/2020 |

(Continued)

OTHER PUBLICATIONS

French Search Report dated Jun. 22, 2022; priority document.

*Primary Examiner* — Craig Kim
(74) *Attorney, Agent, or Firm* — Greer, Burns & Crain, Ltd.

(57) ABSTRACT

A propulsion assembly having a propulsion system including an exhaust nozzle fastened to the nozzle wall on the outside thereof so as to define between them a chamber, and a heat exchanger system ensuring an exchange of heat energy between the hot combustion gases circulating in the exhaust nozzle and the colder fuel circulating in the supply pipe at least in part by thermal radiation through the nozzle wall. The heat exchanger system has a pipe portion arranged in the chamber and the exchange of heat energy takes place at this pipe portion. With such an arrangement, the heat energy of the combustion gases is transferred to the fuel for better combustion.

9 Claims, 2 Drawing Sheets

(51) Int. Cl.
*F02C 7/22* (2006.01)
*F02C 9/46* (2006.01)

(52) U.S. Cl.
CPC .... *F05D 2220/323* (2013.01); *F05D 2240/35* (2013.01); *F05D 2260/213* (2013.01); *F05D 2270/09* (2013.01)

(56) References Cited

U.S. PATENT DOCUMENTS

| | | | | |
|---|---|---|---|---|
| 10,436,118 | B2* | 10/2019 | Weaver | G10K 11/168 |
| 10,612,468 | B2* | 4/2020 | Dierksmeier | F01D 25/12 |
| 10,801,408 | B2* | 10/2020 | Dierksmeier | F01D 15/10 |
| 11,047,307 | B2* | 6/2021 | Roberge | F02C 3/22 |
| 11,060,480 | B2* | 7/2021 | Foutch | F02K 1/34 |
| 11,378,341 | B2* | 7/2022 | Staubach | F28D 7/04 |
| 11,629,647 | B2* | 4/2023 | Staubach | F02C 7/32 |
| | | | | 60/39.511 |
| 2013/0306265 | A1* | 11/2013 | Appukuttan | F02C 7/14 |
| | | | | 165/11.1 |
| 2014/0298771 | A1 | 10/2014 | Zhang et al. | |
| 2015/0315972 | A1* | 11/2015 | Lumbab | F02C 7/045 |
| | | | | 181/290 |
| 2015/0337730 | A1 | 11/2015 | Kupiszewski et al. | |
| 2016/0017810 | A1* | 1/2016 | Lord | F02K 1/827 |
| | | | | 60/725 |
| 2017/0089238 | A1* | 3/2017 | Leyko | B33Y 80/00 |
| 2017/0276440 | A1* | 9/2017 | Kenworthy | F28F 1/32 |
| 2019/0145348 | A1* | 5/2019 | Foutch | F28D 9/0062 |
| | | | | 60/204 |
| 2019/0153947 | A1 | 5/2019 | Peyron et al. | |
| 2020/0088102 | A1 | 3/2020 | Roberge | |
| 2022/0307415 | A1* | 9/2022 | Hayakawa | F02B 63/04 |

FOREIGN PATENT DOCUMENTS

| | | | | |
|---|---|---|---|---|
| GB | 2476855 A | * | 7/2011 | ............. B64D 33/02 |
| WO | 2014105327 A1 | | 7/2014 | |

* cited by examiner

PROPULSION ASSEMBLY FOR AN AIRCRAFT

CROSS-REFERENCES TO RELATED APPLICATIONS

This application claims the benefit of the French patent application No. 2110851 filed on Oct. 13, 2021, the entire disclosures of which are incorporated herein by way of reference.

FIELD OF THE INVENTION

The present invention relates to a propulsion assembly for an aircraft, the propulsion assembly comprising a propulsion system having an exhaust nozzle that discharges the combustion gases from the propulsion system and a heat exchanger arranged at the exhaust nozzle for ensuring heat energy is transferred to the fuel of the propulsion system, and to an aircraft having at least one such propulsion system.

BACKGROUND OF THE INVENTION

In order to move, an aircraft conventionally has at least one propulsion assembly comprising a propulsion system that is arranged in a nacelle and may take the form of a jet engine or a turboprop engine. In each case, the propulsion system has a rotary assembly that drives a fan or a propeller. The rotary assembly constitutes a core of the propulsion system and, from the front to the rear, it has an air inlet that allows the introduction of air into a duct of the core, a compressor that compresses the air thus introduced, a combustion chamber in which the air thus compressed is mixed with a fuel, and a turbine that allows the combustion gases to expand and generates the rotation that is transmitted to the fan or to the propeller.

Downstream of the turbine, an exhaust nozzle ensures the discharge of the combustion gases.

It is also known, in particular in the case of dihydrogen, that the efficiency of the combustion of a fuel is improved if this fuel is heated before the combustion. It is also known to use some of the hot combustion gases discharged by the exhaust nozzle to heat the fuel.

SUMMARY OF THE INVENTION

An object of the present invention is to propose another solution for heating the fuel before its combustion without bleeding the combustion gases.

To that end, there is proposed a propulsion assembly for an aircraft, having:
- a nacelle,
- a propulsion system arranged inside the nacelle and comprising a fairing, a rotary assembly that has a combustion chamber and is housed in the fairing, an exhaust nozzle positioned downstream of the combustion chamber and delimited by a rear portion of the fairing, referred to as nozzle wall, and ensuring the discharge of the combustion gases originating from the combustion of the fuel in the combustion chamber,
- a fuel tank,
- a supply pipe that connects the tank and the combustion chamber,
- a cowling sealingly fastened to the nozzle wall and on the outside thereof, wherein the cowling and the nozzle wall define between them a chamber, and
- a heat exchanger system ensuring, during operation of the propulsion system, an exchange of heat energy between the hot combustion gases circulating in the exhaust nozzle and the colder fuel circulating in the supply pipe at least in part by thermal radiation through the nozzle wall, wherein the heat exchanger system has a pipe portion arranged in the chamber and wherein the exchange of heat energy takes place at this pipe portion, wherein the nozzle wall has passing through it a plurality of orifices that open on one side into the exhaust nozzle and on the other side into the chamber.

With such an arrangement, the heat energy of the combustion gases is transferred to the fuel for better combustion without bleeding the combustion gases.

According to one particular embodiment, the pipe portion of the heat exchanger system is a portion of the supply pipe.

Advantageously, the propulsion assembly has leak detection means provided at the pipe portion, a control unit connected to the leak detection means, and a valve mounted on the supply pipe downstream of the pipe portion and made to open and close by the control unit.

According to one particular embodiment, the heat exchanger system has a circulation pipe in which a heat transfer fluid circulates, a pump arranged so as to move the heat transfer fluid in the circulation pipe and a heat exchanger arranged between the supply pipe and the circulation pipe and the pipe portion of the heat exchanger system is a portion of the circulation pipe.

Advantageously, the pipe portion of the heat exchanger system has at least one turn that surrounds the nozzle wall.

According to one particular embodiment, the diameter of the orifices is between 1 mm and 3 mm.

According to one particular embodiment, the diameter of the orifices is between 0.4 mm and 1 mm, and the nozzle wall has passing through it at least one upstream orifice and at least one downstream orifice of which the diameters are between 20 mm and 40 mm.

Advantageously, the pipe portion of the heat exchanger system is constituted of a single continuous duct.

The invention also proposes an aircraft having at least one propulsion assembly according to one of the preceding variants.

BRIEF DESCRIPTION OF THE DRAWINGS

The abovementioned features of the invention, along with others, will become more clearly apparent upon reading the following description of one exemplary embodiment, the description being given with reference to the appended drawings, in which.

DETAILED DESCRIPTION OF THE PREFERRED EMBODIMENTS

Figure 1:
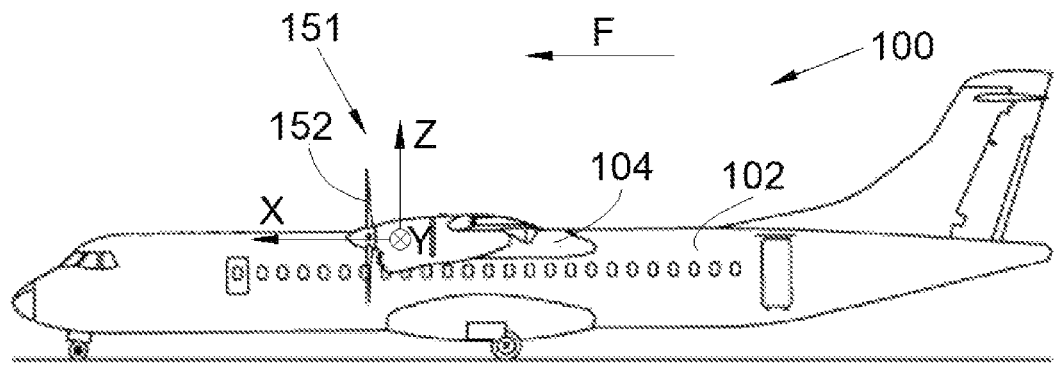
FIG. 1 is a side view of an aircraft having a propulsion assembly according to the invention.

In the following description, terms relating to a position are considered in relation to an aircraft in a position of forward movement, i.e., as shown in FIG. 1 in which the arrow F shows the direction of forward movement of the aircraft.

FIG. 1 shows an aircraft 100 that has a fuselage 102 on either side of which is fastened a wing 104. At least one propulsion assembly 151 is fastened under each wing 104.

Figure 2:
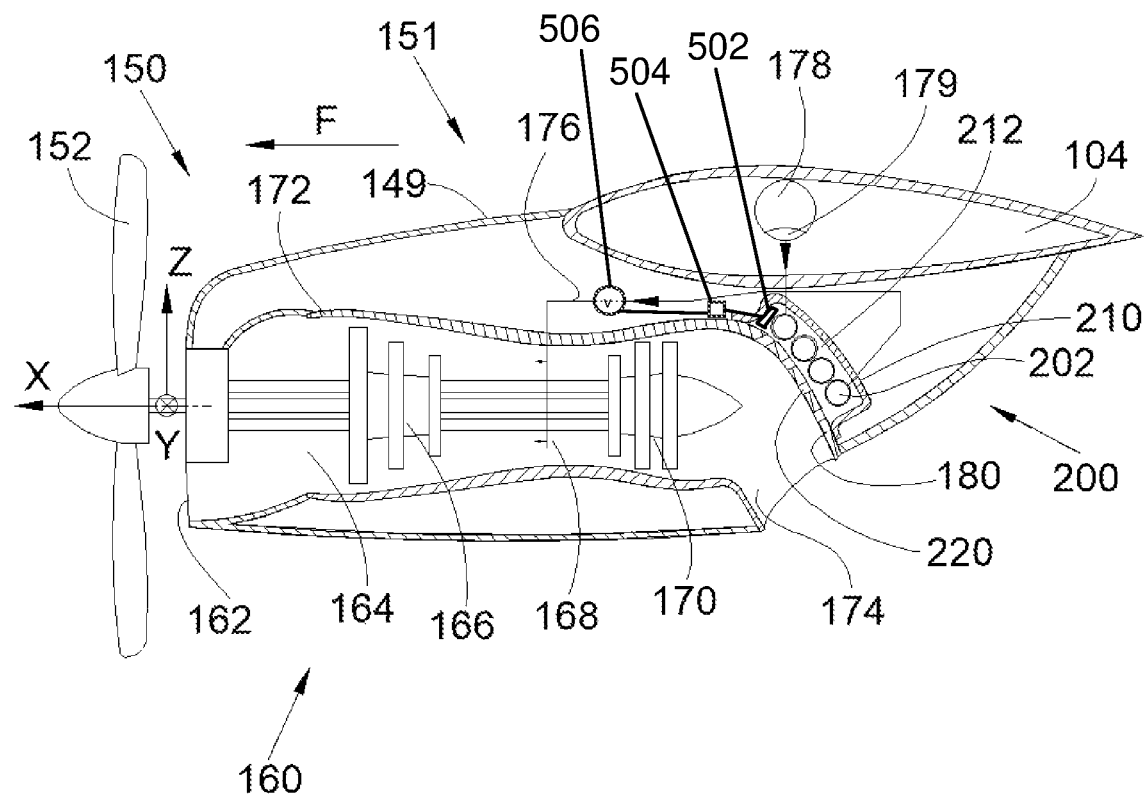
FIG. 2 is a schematic representation in a side view and in section of a propulsion assembly according to a first embodiment of the invention.

FIG. 2 shows the propulsion assembly 151, which comprises a nacelle 149 and a propulsion system 150 surrounded by the nacelle 149. In the embodiment of the invention that is presented here, the propulsion system 150 takes the form of a turboprop engine with a propeller 152 driven in rotation by a rotary assembly mounted inside a fairing 172 of the propulsion system 150 housed inside the nacelle 149, but the propulsion system 150 may also take the form of a jet engine driving a fan. Thus, the propulsion system 150 generally has a rotary assembly and a mobile element 152 (propeller or fan).

In the following description, and by convention, X denotes the longitudinal axis, which corresponds to the axis of rotation of the mobile element 152 with positive orientation in the direction of forward movement of the aircraft 100, Y denotes the transverse axis, which is horizontal when the aircraft is on the ground, and Z denotes the vertical axis or vertical height when the aircraft is on the ground; these three axes X, Y and Z being mutually orthogonal.

Figure 3:
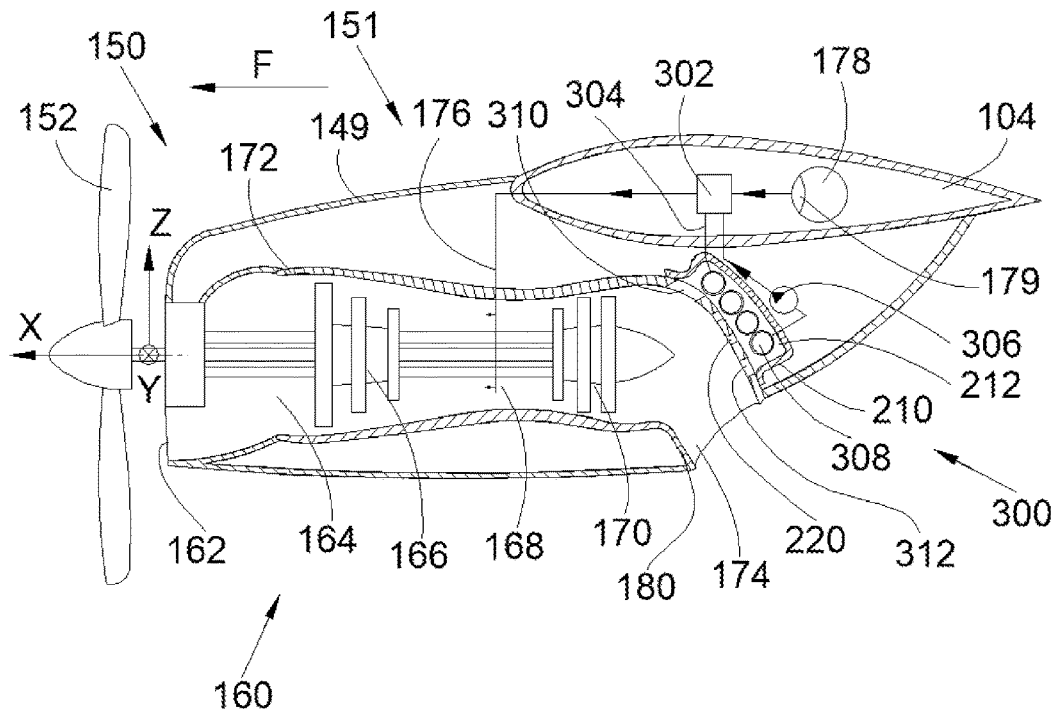
FIG. 3 is a schematic representation in a side view and in section of a propulsion assembly according to a second embodiment of the invention.
Figure 4:
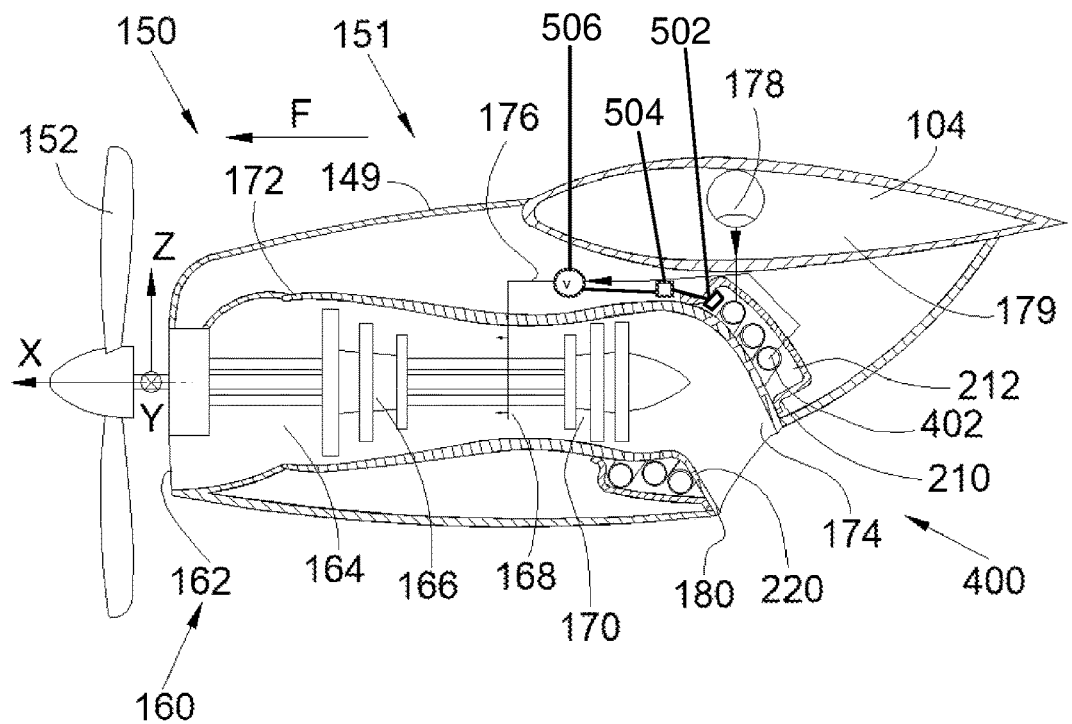
FIG. 4 is a schematic representation in a side view and in section of a variant of the propulsion assembly according to the invention.

FIGS. 2 to 4 show the propulsion system 150 in the case of a turboprop engine. The rotary assembly 160 constitutes a core of the propulsion system 150 and, from the front to the rear, it has an air inlet 162 that allows the introduction of air into a duct 164 of the core, a compressor 166 that compresses the air thus introduced, a combustion chamber 168 in which the air thus compressed is mixed with a fuel and the mixture is burned, and a turbine 170 that allows the combustion gases to expand and generates the rotation that is transmitted to the mobile element, in this instance the propeller 152. The elements of the rotary assembly 160 are surrounded by the fairing 172 formed of structural casings that are mounted around the elements of the rotary assembly 160 and make it possible to stiffen it, in order, in particular, to limit distortions thereof during operation.

The fairing 172 is, on the one hand, open to the front at the air inlet 162 and delimits the duct 164 and is, on the other hand, open to the rear at an exhaust nozzle 174 that is downstream of the turbine 170 and therefore of the combustion chamber 168 and ensures the discharge of the combustion gases originating from the combustion of the fuel and the air in the combustion chamber 168. The rear part of the fairing 172 that surrounds the exhaust nozzle 174 forms the nozzle wall 180.

The space between the nacelle 149 and the fairing 172 is occupied by various systems that ensure the operation of the propulsion system 150. In particular, in order to supply fuel to the combustion chamber 168, the propulsion assembly 151 has a fuel tank 178 that, in this instance, is housed in the wing 104, a supply pipe 176 that connects the tank 178 and the combustion chamber 168 and a pump 179 that moves the fuel from the tank 178 to the combustion chamber 168 through the supply pipe 176. The fuel may be kerosene or dihydrogen (H2), for example. Without departing from the scope of the invention, the fuel tank 178 can also be housed in another part of the aircraft 100, for example in the fuselage 102.

In order to heat the fuel before it is injected into the combustion chamber 168, so as to achieve better combustion, the propulsion assembly 151 also has a heat exchanger system 200, 300, 400, which is arranged in the space between the nacelle 149 and the fairing 172, and which is arranged, when the propulsion system 150 is in operation, to ensure an exchange of heat energy between the hot combustion gases circulating in the exhaust nozzle 174 and the colder fuel circulating in the supply pipe 176. This transfer of heat energy is done at least in part by thermal radiation through the nozzle wall 180 that is brought to high temperature during the operation of the propulsion system 150.

The propulsion assembly 151 also has a cowling 210 that is sealingly fastened to the nozzle wall 180 and on the outside thereof, wherein the cowling 210 and the nozzle wall 180 define between them a chamber 212. The cowling 210 is fastened, for example, by welding or riveting along the periphery of the cowling 210.

The heat exchanger system 200, 300, 400 has a pipe portion 202, 308, 402 arranged in the chamber 212 at the nozzle wall 180 and the exchange of heat energy takes place at this pipe portion 202, 308, 402.

In the embodiment in FIG. 2 and FIG. 4, the pipe portion 202, 402 of the heat exchanger system 200, 400 is a portion of the supply pipe 176 that passes through the cowling 210 a first time so as to enter the chamber 212 and passes through the cowling 210 a second time so as to leave the chamber 212 and reach the combustion chamber 168.

Thus, the pipe portion 202, 402 is fastened in the chamber 212 at the nozzle wall 180 and the fuel is heated directly in the supply pipe 176.

Preferably, in order to maximize the heat transfer, the pipe portion 202, 402 is in contact with the nozzle wall 180 or in proximity to the latter, i.e., at a maximum distance of 50 cm.

In the embodiment in FIG. 2, the pipe portion 202 has a serpentine shape that follows a path on the outside of the nozzle wall 180.

In the embodiment in FIG. 4, the pipe portion 402 of the heat exchanger system 400 surrounds the nozzle wall 180 and it thus has at least one turn that surrounds the nozzle wall 180. Such an arrangement improves the transfer of heat energy from the combustion gases.

In order to prevent a fuel leak at the pipe portion 202, 402, the heat exchanger system 200, 400 has a leak detector 502 provided at the pipe portion 202, 402 and a controller 504 connected to the leak detector 502. The heat exchanger system 200, 400 also has a valve 506 mounted on the supply pipe 176 downstream of the pipe portion 202, 402 with respect to the direction of flow of the fuel and made to open and close by the controller 504. The controller 504 makes the valve 506 close when the leak detector 502 detects a fuel leak at the pipe portion 202, 402.

In the embodiment in FIG. 3, the heat exchanger system 300 has a circulation pipe 304 in which a heat transfer fluid circulates, a pump 306 arranged so as to move the heat transfer fluid in the circulation pipe 304, wherein the pipe portion 308 of the heat exchanger system 300 is a portion of the circulation pipe 304 that passes through the cowling 210 a first time so as to enter the chamber 212 and passes through the cowling 210 a second time so as to leave the chamber 212.

As above, the pipe portion 308 is, for example, fastened in contact with the nozzle wall 180 or in proximity to the latter, i.e., at a maximum distance of 50 cm, in order to ensure a transfer of heat energy from the combustion gases to the heat transfer fluid.

The heat exchanger system 300 also has a heat exchanger 302 arranged between the supply pipe 176 and the circulation pipe 304 so as to ensure a transfer of heat energy from the heat transfer fluid to the fuel. In this way, the fuel is heated indirectly via a heat transfer fluid.

In the embodiment in FIG. 3, the pipe portion 308 has for example a serpentine shape that follows a path on the outside of the nozzle wall 180. However, the pipe portion 308 can also have at least one turn that surrounds the nozzle wall 180, thus reproducing the variant in FIG. 4.

In the embodiment in FIG. 4, the cowling 210 takes the general shape of a cylinder fastened around the nozzle wall 180.

According to one particular embodiment of the invention and in each of the embodiments described here, the nozzle wall 180 has passing through it a plurality of orifices 220 that open on one side into the exhaust nozzle 174 and on the other side into the chamber 212.

According to one particular embodiment of the invention, the diameter of the orifices 220 is between 1 mm and 3 mm. These orifices 220 then act as acoustic attenuator at the exhaust nozzle 174, using the chamber 212 to attenuate the noise, and as passage for a stream of air coming from the exhaust nozzle 174 and entering the chamber 212 in order to improve the heat transfer with the pipe portion 202, 308, 402.

According to another particular embodiment of the invention, the diameter of the orifices 220 is between 0.4 mm and 1 mm. These orifices 220 then act only as acoustic attenuator at the exhaust nozzle 174, using the chamber 212 to attenuate the noise. In this embodiment that is more particularly shown in FIG. 3, the nozzle wall 180 has passing through it at least one upstream orifice 310 and at least one downstream orifice 312 of which the diameters are between 20 mm and 40 mm so as to ensure the circulation of air in the chamber 212 and improve the heat transfer with the pipe portion 308. The or each upstream orifice 310 is located at a front part of the cowling 210 and the or each downstream orifice 312 is located at a rear part of the cowling 210.

According to another particular embodiment, the diameters of the orifices 220 vary along the nozzle wall 180 and are adapted to the frequencies to be attenuated and vary for example between 0.4 mm and 3 mm.

In these various embodiments, the acoustic attenuation can be improved by putting in place partitions inside the chamber 212. These partitions extend generally perpendicularly to the nozzle wall 180 between the nozzle wall 180 and the cowling 210. The partitions are fastened by any appropriate means such as welding or riveting. These partitions delimit between them cavities that open into the exhaust nozzle 174 through one of the orifices 220. The dimensions of each cavity are adapted depending on the acoustic frequencies to be attenuated.

In order to limit the risk of leakage from the pipe portion 202, 308, 402 into the chamber 212, the pipe portion 202, 308, 402 of the heat exchanger system 200, 300, 400 is constituted of a single continuous duct.

According to one particular assembly mode, the pipe portion 202, 308, 402 is welded to the cowling 210 at the point at which the pipe portion 202, 308, 402 passes through the cowling 210, i.e., so as to enter and leave the chamber 212. Then the cowling 210 thus equipped with the pipe portion 202, 308, 402 is welded to the nozzle wall 180.

In order to limit distortions between the cowling 210 and the nozzle wall 180 under the effect of heat, the cowling 210 and the nozzle wall 180 are made of the same material.

And in the same way, for distortions between the cowling 210 and the pipe portion 202, 308, 402 under the effect of heat, the cowling 210 and the pipe portion 202, 308, 402 of the heat exchanger system 200, 300, 400 are made of the same material.

In order to fasten the pipe portion 202, 308, 402 in the chamber 212, it is also possible to use fastening means that fasten the pipe portion 202, 308, 402 to the cowling 210. In order to limit the stresses in the event of deformation of the pipe portion 202, 308, 402 under the effect of heat, the fastening means are designed to allow expansion of the pipe portion. The fastening means are for example a plurality of collars, each one being fastened to the cowling 210 and gripping the pipe portion.

In order to further improve the heat transfer in the chamber 212, a layer of a thermal insulator can be affixed against the cowling 210 on the opposite side from the chamber 212.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, comprising:
a nacelle,
a propulsion system arranged inside the nacelle and comprising a fairing, a rotary assembly that has a combustion chamber and is housed in the fairing, an exhaust nozzle positioned downstream of the combustion chamber and delimited by a rear portion of the fairing, referred to as nozzle wall, and ensuring a discharge of combustion gases originating from combustion of fuel in the combustion chamber,
a fuel tank,
a supply pipe that connects the tank and the combustion chamber,
a cowling sealingly fastened to the nozzle wall and on the outside thereof, wherein the cowling and the nozzle wall define between them a chamber, and
a heat exchanger system ensuring, during operation of the propulsion system, an exchange of heat energy between the hot combustion gases circulating in the exhaust nozzle and the colder fuel circulating in the supply pipe at least in part by thermal radiation through the nozzle wall,
wherein the heat exchanger system has a pipe portion arranged in said chamber, and
wherein the exchange of heat energy takes place at this pipe portion,
wherein the nozzle wall has passing therethrough a plurality of orifices that open on one side into the exhaust nozzle and on the other side into the chamber,
wherein the heat exchanger system has a circulation pipe in which a heat transfer fluid circulates, a pump configured to move the heat transfer fluid in the circulation pipe, and a heat exchanger arranged between the supply pipe and the circulation pipe, and
wherein said pipe portion of the heat exchanger system is a portion of the circulation pipe.

2. The propulsion assembly according to claim 1, wherein the pipe portion of the heat exchanger system has at least one turn that surrounds the nozzle wall.

3. The propulsion assembly according to claim 1, wherein a diameter of the orifices is between 1 mm and 3 mm.

4. The propulsion assembly according to claim 1,
wherein a diameter of the orifices is between 0.4 mm and 1 mm, and
wherein the nozzle wall has passing through it at least one upstream orifice and at least one downstream orifice of which the diameters are between 20 mm and 40 mm.

5. The propulsion assembly according to claim 1, wherein said pipe portion of the heat exchanger system is constituted of a single continuous duct.

6. An aircraft having at least one propulsion assembly according to claim 1.

7. A propulsion assembly for an aircraft, comprising:
a nacelle,
a propulsion system arranged inside the nacelle and comprising a fairing, a rotary assembly that has a combustion chamber and is housed in the fairing, an exhaust nozzle positioned downstream of the combustion chamber and delimited by a rear portion of the fairing, referred to as nozzle wall, and ensuring a discharge of combustion gases originating from combustion of fuel in the combustion chamber,
a fuel tank,
a supply pipe that connects the tank and the combustion chamber,
a cowling sealingly fastened to the nozzle wall and on the outside thereof, wherein the cowling and the nozzle wall define between them a chamber, and
a heat exchanger system ensuring, during operation of the propulsion system, an exchange of heat energy between the hot combustion gases circulating in the exhaust nozzle and the colder fuel circulating in the supply pipe at least in part by thermal radiation through the nozzle wall,
wherein the heat exchanger system has a pipe portion arranged in said chamber, and
wherein the exchange of heat energy takes place at this pipe portion,
wherein the nozzle wall has passing therethrough a plurality of orifices that open on one side into the exhaust nozzle and on the other side into the chamber,
wherein a diameter of the orifices is between 0.4 mm and 1 mm, and
wherein the nozzle wall has passing through it at least one upstream orifice and at least one downstream orifice of which the diameters are between 20 mm and 40 mm.

8. The propulsion assembly according to claim 7, wherein the pipe portion of the heat exchanger system is a portion of the supply pipe.

9. The propulsion assembly according to claim 8, further comprising:
a leak detector provided at said pipe portion,
a controller connected to the leak detection means, and
a valve mounted on the supply pipe downstream of the pipe portion and made to open and close by the controller.

* * * * *